US006348532B1

(12) United States Patent
Mayer

(10) Patent No.: US 6,348,532 B1
(45) Date of Patent: Feb. 19, 2002

(54) PROCESS FOR THE PREPARATION OF VINYLAROMATIC COPOLYMER REDISPERSION POWDERS REDISPERSIBLE IN WATER

(75) Inventor: Theo Mayer, Julbach (DE)

(73) Assignee: Wacker Polymer Systems GmbH & Co. KG, Burghausen (DE)

(*) Notice: Subject to any disclaimer, the term of this patent is extended or adjusted under 35 U.S.C. 154(b) by 0 days.

(21) Appl. No.: 09/592,997

(22) Filed: Jun. 12, 2000

(30) Foreign Application Priority Data

Jun. 24, 1999 (DE) .......................... 199 29 008

(51) Int. Cl.$^7$ .............. C08K 5/09; C08L 35/06
(52) U.S. Cl. .............. 524/291; 524/320; 524/819; 524/822; 523/340; 523/342
(58) Field of Search ............... 523/340, 342; 524/291, 320, 81 P, 822

(56) References Cited

U.S. PATENT DOCUMENTS

| 3,784,648 | A | | 1/1974 | Bergmeister et al. |
| 4,169,828 | A | | 10/1979 | Wright |
| 4,774,271 | A | | 9/1988 | Lindner et al. |
| 5,225,478 | A | * | 7/1993 | Beckerle et al. |
| 6,080,804 | A | * | 6/2000 | Davies et al. |

FOREIGN PATENT DOCUMENTS

| CA | 1137672 | | 12/1982 |
| DE | 314 30 70 | | 5/1983 |
| DE | 3917646 | * | 8/1990 |
| DE | 19617716 | | 11/1997 |
| EP | 7044 | | 1/1980 |
| EP | 78449 | | 5/1983 |
| EP | 234393 | | 9/1987 |
| WO | 97/25371 | | 7/1997 |
| WO | 97/42255 | | 11/1997 |

OTHER PUBLICATIONS

Derwent Abstract Corr. to DE–A 314 30 70 [AN 1983–46975K ].
Derwent Abstract Corr. to WO–A 97/42255 [AN 1997–537419 ].
Derwent Abstract Corr. to DE–C 3917646 [AN 1990–247712 ].
Fox T. G., Bull. Am. Physics Soc., 1, 3, p. 123 (1956).*
The Polymer Handbook, 2nd Edition, J. Wiley & Sons, New York (1975).*
Derwent Abstract Corresponding to EP 78449 AN [1983 –46976K ].*
Derwent Abstract Corresponding to WO 97/25371 AN [1997–372831 ].

* cited by examiner

Primary Examiner—Tae H. Yoon
(74) Attorney, Agent, or Firm—Collard & Roe, P.C.

(57) ABSTRACT

A process for the preparation of vinylaromatic copolymer redispersion powders redispersible in water is by free-radical emulsion polymerization of a comonomer mixture including (a) one or more vinylaromatic comonomers,
(b) one or more 1,3-diene comonomers (b1) or one or more comonomers (b2) from the group including the alkyl esters having 1 to 8 C atoms of acrylic acid or methacrylic acid and
(c) 0.1 to 10% by weight, based on the total weight of the comonomer mixture, of one or more comonomers from the group including the ethylenically unsaturated mono- or dicarboxylic acids or the anhydrides thereof, the ethylenically unsaturated carboxamides, the ethylenically unsaturated sulfonic acid compounds and in each case the salts thereof, and drying of the aqueous copolymer dispersion obtainable thereby. One or more hydroxycarboxylic acids or the salts thereof are added to the aqueous copolymer dispersion in an amount of 3 to 40% by weight, based on the total weight of copolymer, before or during the polymerization or before the drying.

15 Claims, No Drawings

PROCESS FOR THE PREPARATION OF VINYLAROMATIC COPOLYMER REDISPERSION POWDERS REDISPERSIBLE IN WATER

BACKGROUND OF THE INVENTION

1. Field of the Invention

The present invention relates to a process for the preparation of vinylaromatic copolymer redispersion powders redispersible in water and the use of the products of the process.

2. The Prior Art

Polymer powders are known which are dispersible in water and are obtainable by drying the corresponding polymer dispersions. These powders have been successfully used for many years, in particular in the construction sector. They improve the properties of hydraulically setting systems, such as cement mortars. For example they improve their abrasion resistance, flexural strength and adhesion. Usually, such products are prepared on the basis of a polyvinyl acetate, vinyl acetate/ethylene copolymers, vinyl acetate/vinyl ester copolymers and vinyl chloride/ethylene copolymer and are commercially available.

The requirements which an industrially usable dispersion powder has to meet are very high. Specifically, this powder must be free-flowing, and it may not cake during storage; i.e.—it may not lose its flowability in the course of time. If the powder cakes, it becomes virtually impossible to handle. Large lumps can no longer be mixed into the pulverulent formulation. To display its full effectiveness, the powder must be very readily redispersible in water so that the initial particles of the dispersion are obtained.

It is desirable to avoid caking under pressure and temperature during storage of the redispersion powder and at the same time to achieve very good redispersion properties in water. Hence considerable amounts of antiblocking agents and protective colloids are added to the so-called powder-based dispersions. U.S. Pat. No. 3,784,648 discloses adding melamine formaldehyde sulfonate condensates to the dispersion prior to drying in order to obtain polymer powders which are easily redispersible. DE-A 3,143,070 recommends the addition of naphthalene formaldehyde sulfonates, while EP-A 78,449 suggests the addition of vinylpyrrolidone/vinyl acetate copolymers; and WO-A 97/25371 suggests the addition of amino acids or their water-soluble salts prior to drying of the dispersion.

In specific applications, in particular for aqueous dispersions of styrene copolymers, the presence of protective colloids is not desirable. This is because they adversely affect the performance characteristics of the styrene copolymers.

SUMMARY OF THE INVENTION

It is therefore an object to provide a process for the preparation of emulsifier-stabilized, protective colloid-free redispersion powders based on vinylaromatic copolymers, by means of which a redispersible, agglomerate-free redispersion powder stable to blocking and having a long self life can be obtained even without the addition of protective colloids as an atomizing aid.

The above object is achieved according to the present invention by adding hydroxycarboxylic acid to the polymer dispersion to be dried. To date, EP-A 234,393 (U.S. Pat. No. 4,774,271) had only disclosed that tricarboxylic acids or their derivatives can be added for drying dispersions which contain impact modifiers in the form of graft polymers on a rubber base. Redispersion powders and their preparation are not discussed in this document. For the preparation of redispersion powders for cosmetic or pharmaceutical applications, WO-A 97/42255 discloses drying these powders in pH ranges of from 2.0 to 6.5 or from 7.5 to 12, the pH being established by adding buffer systems. DE-C 3,917,646 describes the use of hydroxycarboxylic acids as agglomeration assistants for the agglomeration of the fine fractions of synthetic, pulverulent polymers.

The present invention relates to a process for the preparation of vinylaromatic copolymer redispersion powders redispersible in water by means of free-radical emulsion polymerization of a comonomer mixture comprising a) one or more vinylaromatic comonomers; and b) one or more 1,3-diene comonomers (b1) or one or more comonomers (b2) selected from the group consisting of the alkyl esters having 1 to 8 C atoms of acrylic acid or methacrylic acid; and c) 0.1 to 10% by weight, based on the total weight of the comonomer mixture, of one or more comonomers selected from the group consisting of the ethylenically unsaturated monocarboxylic acids or dicarboxylic acids or the anhydrides thereof, the ethylenically unsaturated carboxamides, the ethylenically unsaturated sulfonic acid compounds and in each case the salts thereof;

and drying of the aqueous copolymer dispersion obtainable thereby, with one or more hydroxycarboxylic acids or the salts thereof being added in an amount of 3% to 40% by weight, based on the total weight of copolymer, either before the polymerization or during the polymerization or after the polymerization but before the drying.

Suitable vinylaromatic comonomers a) are styrene, methyl-styrene and vinyltoluene, with styrene being preferred. Suitable 1,3-diene comonomers (b1) are 1,3-butadiene and isoprene, with 1,3-butadiene being preferred. Suitable comonomers (b2) from the, group consisting of the-alkyl esters of (meth)acrylic acid are, for example, methyl methacrylate, methyl acrylate, n-butyl methacrylate, n-butyl acrylate, ethyl methacrylate, ethyl acrylate, 2-ethylhexyl methacrylate and 2-ethylhexyl acrylate. Methyl methacrylate, ethyl acrylate, n-butyl acrylate and 2-ethylhexyl acrylate are preferred; and n-butyl acrylate is particularly preferred.

Examples of comonomers c) from the group consisting of the carboxylic acids and the anhydrides thereof are acrylic acid, methacrylic acid, fumaric acid, itaconic acid, crotonic acid, maleic acid, mesaconic acid, glutaric acid and maleic anhydride. Examples of comonomers from the group consisting of the carboxamides are acrylamide and methacrylamide. Examples of comonomers from the group consisting of the sulfonic acids are vinylsulfonic acid and 2-acrylamidopropanesulfonic acid. Acrylic acid, methacrylic acid, fumaric acid, maleic acid and maleic anhydride are preferred.

The choice of monomers or the choice of the amounts by weight of the comonomers is made in such a way that in general a glass transition temperature Tg of $-70°$ C. to $+68°$ C., preferably $-50°$ C. to $+50°$ C., in particular $0°$ C. to $+25°$ C., results. The glass transition temperature Tg of the polymers can be determined in a known manner by means of differential scanning calorimetry (DSC). The Tg can also be calculated approximately beforehand by means of the Fox equation. According to Fox T. G., *Bull. Am. Physics Soc.* 1, 3, page 123 (1956), the following applies: $1/Tg = x_1/Tg_1 + x_2/Tg_2 + \ldots + x_n/Tg_n$, where $x_n$ represents the mass fraction (% by weight/100) of the monomer n and $Tg_n$ is the glass transition temperature in degrees Kelvin of the homopolymer of the monomer n. Tg values for homopolymers are shown in *Polymer Handbook 2nd Edition*, J. Wiley & Sons, New York (1975).

In general, the comonomer mixture contains 15.0% to 85.0% by weight, preferably 30% to 80.0% by weight, of vinylaromatic a) and 15.0% to 85.0% by weight, preferably 30% to 69.9% by weight, of 1,3-diene (b1) or (meth)acrylate (b2). The amount of comonomer c) is 0.1% to 10% by weight, preferably 2% to 5% by weight, based in each case on the total weight of the comonomer mixture.

Suitable examples of hydroxycarboxylic acids are organic acids which contain one or more OH groups in the molecule, in addition to one or more COOH groups. Monohydroxy and dihydroxy derivatives of monocarboxylic acids, dicarboxylic acids, or tricarboxylic acids having in general 2 to 10 C atoms are preferred. Mandelic acid (hydroxyphenylacetic acid), lactic acid (2-hydroxypropionic acid), malic acid (hydroxysuccinic acid), tartaric acid (2,3-dihydroxybutanedioic acid) and citric acid are particularly preferred. Citric acid (2-hydroxy-1,2,3-propanetricarboxylic acid) is most preferably used. The hydroxycarboxylic acids can also be used in the form of their salts, and in this case in particular in the form of water-soluble salts or salts soluble in aqueous alkaline media. These may be, for example, sodium salts, potassium salts, ammonium salts or calcium salts. Preferably, the amount of hydroxycarboxylic acid is 7% to 30% by weight, based on the total weight of copolymer.

The preparation of the emulsifier-stabilized vinylaromatic copolymers is carried out by the emulsion polymerization method. The polymerization temperature is in general 0° C. to 100° C., preferably 50° C. to 80° C. The polymerization can be carried out by the batch method, with all of the components being initially introduced into the reactor. The polymerization can be carried out also by the feed method, with the individual components or a plurality of components being fed in during the polymerization. Mixed types with initial introduction and feed are preferred. The feed can be carried separately (spatially and with respect to time) or some or all of the components to be metered can be emulsified before being metered.

The dispersants used may be all the emulsifiers usually used in emulsion polymerization with no protective colloids being used as the dispersants. Suitable emulsifiers are anionic, cationic and nonionic emulsifiers. Preferably, the emulsifiers are used in an amount from 0.1% to 5% by weight, based on the total weight of the monomers. For example, anionic surfactants, such as alkyl sulfates having a chain length from 8 to 18 C atoms, alkyl or alkylaryl ether sulfates having 8 to 18 C atoms in the hydrophobic radical and up to 40 ethylene oxide or propylene oxide units, alkylsulfonates or alkylarylsulfonates having 8 to 18 C atoms and esters and monoesters of sulfosuccinic acid with monohydric alcohols or alkylphenols are suitable. Suitable nonionic surfactants are, for example, alkyl polyglycol ethers or alkylaryl polyglycol ethers having 8 to 40 ethylene oxide units.

The initiation is effected by means of the customary, at least partially water-soluble free radical initiators, which are preferably used in amounts of 0.01% to 3.0% by weight, based on the total weight of the monomers. Examples of these are sodium persulfate, hydrogen peroxide, tert-butyl peroxide, tert-butyl hydroperoxide, potassium peroxodisulfate and azobisisobutyronitrile. If required, these free radical initiators can also be combined in a known manner with 0.01% to 3.0% by weight, based on the total weight of the monomers, of reducing agents. For example, alkali metal formaldehyde sulfoxylates and ascorbic acid are suitable. In the redox initiation, one or both redox catalyst components are preferably metered during the polymerization.

For adjusting the molecular weight or for adjusting the degree of crosslinking, as, for example, in the polymerization of styrene/butadiene copolymers, regulators are usually used. Examples of regulators include n-dodecyl mercaptan, tert-dodecyl mercaptan, mercaptopropionic acid, methyl mercaptopropionate, isopropanol and acetaldehyde. These regulators can be added during the polymerization, preferably in amounts of 0.1% to 3.0% by weight, based on the total weight of the monomers.

The aqueous dispersions obtainable by the process according to the invention have a solids content of 30% to 75% by weight, preferably 40% to 65% by weight. The particle size of the dispersion particles is between 0.05 and 5 $\mu$m, preferably between 0.1 and 0.3 $\mu$m.

The quantity of hydroxycarboxylic acid can be added before the polymerization or during the polymerization or after the end of the polymerization and before the drying. The hydroxycarboxylic acid is preferably added as an aqueous solution up to the end of the polymerization and before the drying of the copolymer dispersion. Prior to spraying, the mixture obtained preferably has a total solids content of 25% to 50% by weight, and a pH of, preferably, 6.7 to 7.5 and a Brookfield viscosity (20 rpm) of, preferably, 100 to 300 mPas.

For the preparation of the polymer powders redispersible in water, the aqueous dispersions are dried, for example by means of fluidized-bed drying, freeze-drying or spray-drying. Preferably, the dispersions are spray-dried. The spray-drying is carried out in conventional spray-drying plants. It is possible to effect the atomization by means of airless nozzles, binary nozzles or multimedium nozzles or with a rotating disk. The outlet temperatures in general are chosen in the range from 55° C. to 100° C., preferably 70° C. to 90° C., depending on the plant, glass transition temperature of the resin and desired degree of drying.

It is also possible that water-soluble polymers, for example selected from the group consisting of the polyvinyl alcohols, starches, celluloses, casein, melamine formaldehyde sulfonate, naphthalene formaldehyde sulfonate and poly(meth)acrylic acid, can be added as an atomizing aid for the drying. Drying without the addition of atomizing aids is preferred.

If required, the powder composition can also be modified with further additives. Examples of these are antiblocking agents, dyes, pigments, plasticizers, film-forming assistants, antifoams, catalysts, rheology assistants, thickeners, adhesives and emulsifiers. However, if they are liquid in the original state, they must then be converted into a pulverulent state prior to admixing.

During the atomization, the content of up to 1.5% by weight of antifoam, based on the base polymer, has often proven advantageous. To increase the storability by improving the stability to caking, in particular in the case of powders having a low glass transition temperature, an antiblocking agent (anticaking agent) can be added to the powder obtained. This antiblocking agent is added preferably in an amount of up to 30% by weight, based on the total weight of polymeric components. Examples of antiblocking agents are kaolin, Ca or Mg carbonate, talc, gypsum, silica and silicates having particle sizes preferably in the range from 10 nm to 10 $\mu$m.

The pulverulent composition prepared according to the invention can be completely redispersed by simply stirring into (dispersing in) water at room temperature. Completely redispersed means that the addition of sufficient amounts of water results in a polymer redispersion and its particle size distribution corresponds virtually to the particle size distribution of the base dispersion.

The hydroxycarboxylic acid-modified polymer powders redispersible in water can be used in the applications typical of for them. Examples of use include in chemical products for the construction industry in combination with inorganic, hydraulically setting binders, such as cement (Portland, alumina, trass, slag, magnesia and phosphate cement), plaster and water glass, for the a production of construction adhesives, renders, filling compounds, floor filling compounds, concrete repair mortar, joint mortar and paints. Further uses include as sole binders for coating materials and adhesives or as coating materials and binders for textiles and paper.

DETAILED DESCRIPTION OF PREFERRED EMBODIMENTS

Other objects and features of the present invention will become apparent from the following detailed description considered in connection with the accompanying Examples which disclose several embodiments of the present invention. It should be understood, however, that the Examples are designed for the purpose of illustration only and not as a definition of the limits of the invention.

EXAMPLE 1

A conventional protective colloid-free, emulsifier-stabilized polymer dispersion (COULTER LS® 230; $D_w=0.18\,\mu m \pm 0.1\,\mu m$), prepared by emulsion polymerization of styrene, 1,3-butadiene, acrylic acid and ethylenically unsaturated dicarboxylic acid, was initially introduced into a glass reaction vessel equipped with a stirrer. A 30% strength by weight aqueous citric acid solution (2-hydroxy-1,2,3-propanetricarboxylic acid) was added to the dispersion while stirring. The corresponding amounts were chosen so that a mixture having a solids content of 15% by weight (18% by weight, based on amount of polymer) of citric acid and 85% by weight of film-forming polymer (resin) was obtained. The pH of the citric acid-containing dispersion was then adjusted to pH 7.0 with an aqueous 10% strength by weight sodium hydroxide solution.

A stable, coagulum-free mixture which had a solids content of 45% in combination with a viscosity (Brookfield viscosimeter, 20° C., 20 rpm) of 380 mPas was obtained.

The preparation of the redispersion powder was carried out by spray-drying in a Nubilosa spray-drying unit at an inlet temperature of 110° C. and an outlet temperature of 80° C. and a compressed air pressure of 4 bar. During the spray-drying of the dispersion, a kaolin powder having a particle size of about 3 $\mu$m was admixed. The amount was chosen so that 10% by weight of kaolin were present in the pulverulent composition at the end of the drying. 20% by weight of commercial antiblocking agent (mixture of calcium magnesium carbonate and magnesium hydrosilicate) were also added to the dry powder obtained.

The powder obtained had a mean particle size of 85 $\mu$m. Regarding its properties, the powder proved to be very free-flowing, stable to blocking (storage-stable) and very readily and spontaneously redispersible. By adding water, a polymer redispersion whose particle size distribution virtually corresponded to the particle size distribution of the base dispersion was obtained with the powder. Regarding the cement stability and effect on the cement setting behavior of the redispersion, no difference was found compared with the powder base dispersion.

EXAMPLE 2

The preparation was carried out analogously to Example 1, but the amounts of styrene/butadiene copolymer dispersion and citric acid were chosen so that a mixture having a solids content of 20% by weight (25% by weight, based on amount of polymer) of citric acid and 80% by weight of film-forming polymer (resin) was obtained. All other measures corresponded to Example 1. A stable, coagulum-free mixture which had a solids content of 44.3% in combination with a viscosity (Brookfield viscosimeter, 20° C., 20 rpm) of 320 mPas was obtained. The spray-drying of the mixture and the addition of the antiblocking agent were carried out analogously to Example 1.

The powder obtained had a mean particle size of 80 $\mu$m. Regarding its properties, the powder proved to be very free-flowing, stable to blocking (storage-stable) and very readily and spontaneously redispersible. By adding water, a polymer redispersion whose particle size distribution virtually corresponded to that of the base dispersion was obtained with the powder. Regarding the cement stability and effect on the cement setting behavior of the redispersion, no difference was found compared with the powder base dispersion.

EXAMPLE 3

The preparation was carried out analogously to Example 1 but the styrene/butadiene copolymer dispersion was mixed with citric acid and a sodium polyacrylate having a molar mass of 2000. The corresponding amounts were chosen so that the mixture having a solids content of 10% by weight (12.5% by weight, based on amount of polymer) of citric acid, 10% by weight of Na polyacrylate and 80% by weight of film-forming polymer (resin) was obtained. All other measures corresponded to Example 1. A stable, coagulum-free mixture which had a solids content of 44.8% in combination with a viscosity (Brookfield viscosimeter, 20° C., 20 rpm) of 335 mPas was obtained. The spray-drying of the mixture and the addition of the antiblocking agent were carried out analogously to Example 1.

The powder obtained had a mean particle size of 90 $\mu$m. Regarding its properties, the powder proved to be very free-flowing, stable to blocking (storage-stable) and very readily and spontaneously dispersible and redispersible. By adding water, a polymer redispersion whose particle size distribution virtually corresponded to that of the base dispersion was obtained with the powder. Regarding the cement stability and effect on the cement setting behavior of the redispersion, no difference was found compared with the powder base dispersion.

COMPARATIVE EXAMPLE 4

The styrene/butadiene copolymer dispersion used in Examples 1 to 3 was adjusted to pH 7.0 with an aqueous 10% strength by weight sodium hydroxide solution and then spray-dried without the addition of citric acid or Na polyacrylate. The dispersion had a solids content of 45% in combination with a viscosity (Brookfield viscosimeter, 20° C., 20 rpm) of 350 mPas. The spray-drying of the dispersion and the addition of the antiblocking agent were carried out analogously to Example 1.

The powder obtained had a mean particle size of 87 $\mu$m. The powder was not redispersible in water. The particle size of 87 $\mu$m did not change as a result of adding water.

COMPARATIVE EXAMPLE 5

The preparation was carried out analogously to Example 1 but the amounts of styrene/butadiene copolymer dispersion and citric acid were chosen so that a mixture having a solids content of 2% by weight (2.1% by weight, based on amount of polymer) of citric acid and 98% by weight of film-forming polymer (resin) was obtained. All other measures corresponded to Example 1. A stable, coagulum-free mixture which had a solids content of 44.5% in combination with a viscosity (Brookfield viscosimeter, 20° C., 20 rpm) of 330 mPas was obtained. The spray-drying of the mixture and the addition of the antiblocking agent were carried out analogously to Example 1.

The powder obtained had a mean particle size of 85 $\mu$m. The powder was not redispersible in water. The particle size of 85 $\mu$m did not change as a result of adding water.

Accordingly, while a few embodiments of the present invention have been shown and described, it is to be understood that many changes and modifications may be made thereunto without departing from the spirit and scope of the invention as defined in the appended claims.

What is claimed is:

1. A process for the preparation of a vinylaromatic copolymer redispersion powder redispersible in water comprising the steps of free-radical emulsion polymerizing of a comonomer mixture comprising
   (a) at least one vinylaromatic comonomer;
   (b) at least one comonomer selected from the group consisting of a 1,3-diene comonomer (b1) and an ester comonomer (b2) selected from -the group consisting of an alkyl ester having 1 to 8 C atoms of acrylic acid and an alkyl ester having 1 to 8 C atoms of methacrylic acid and
   (c) 0.1 to 10% by weight, based on the total weight of the comonomer mixture, of at least one ethylenically unsaturated comonomer selected from the group consisting of an ethylenically unsaturated monocarboxylic acid, an ethylenically unsaturated dicarboxylic acid and anhydrides thereof, an ethylenically unsaturated carboxamide, an ethylenically unsaturated sulfonic acid, and salts thereof; and
   drying an aqueous copolymer dispersion obtained thereby; and
   adding at least one hydroxycarboxylic acid or a salt thereof to the aqueous copolymer dispersion in an amount of 3% to 40% by weight, based on the total weight of copolymer, in a manner selected from the group consisting of before the polymerizing, during the polymerizing, and after the polymerizing but before the drying.

2. The process as claimed in claim 1, comprising copolymerizing 15.0% to 85.0% by weight of vinylaromatic (a) and 15.0% to 85.0% by weight of 1,3-diene (b1) or (meth)acrylate (b2).

3. The process as claimed in claim 1, wherein said vinylaromatic comonomer (a) is styrene.

4. The process as claimed in claim 1, wherein said comonomer (b1) is 1,3-butadiene, and wherein said ester comonomer (b2) is selected from the group consisting of methyl methacrylate, methyl acrylate, n-butyl methacrylate, n-butyl acrylate, ethyl methacrylate, ethyl acrylate, 2-ethylhexyl methacrylate and 2-ethylhexyl acrylate.

5. The process as claimed in claim 1, wherein said comonomer (c) is selected from the group consisting of acrylic acid, methacrylic acid, fumaric acid, itaconic acid, crotonic acid, maleic acid, mesaconic acid, glutaric acid, maleic anhydride, acrylamide, methacrylamide, vinylsulfonic acid and 2-acrylamidopropanesulfonic acid.

6. The process as claimed in claim 1, wherein said hydroxy carboxylic acid is selected from the group consisting of a monohydroxy carboxylic acid and a dihydroxy carboxylic acid of an acid selected from the group consisting of a monocarboxylic acid having 2 to 10 C atoms, dicarboxylic acid having 2 to 10 C atoms, tricarboxylic acid having 2 to 10 C atoms, a sodium salt thereof, a potassium salt thereof, an ammonium salt thereof and a calcium salt thereof.

7. The process as claimed in claim 6, wherein said hydroxycarboxylic acid is selected from the group consisting of mandelic acid (hydroxyphenylacetic acid), lactic acid (2-hydroxypropionic acid), malic acid (hydroxysuccinic acid), tartaric acid (2,3-dihydroxybutanedioic acid) and citric acid (2-hydroxy-1,2,3-propanetricarboxylic acid).

8. The process as claimed in claim 1, wherein the amount of hydroxycarboxylic acid is 7% to 30% by weight, based on the total weight of the copolymer.

9. A chemical product composition comprising
   a substance selected from the group consisting of an inorganic hydraulically setting binder, a cement, a plaster, a water glass, a construction adhesive, a render, a filling compound, a floor filling compound, a concrete repair mortar, a joint mortar and a paint, in combination with
   a redispersion powder redispersible in water produced by the process as claimed in claim 1.

10. A sole binder for coating materials and adhesives comprising
    a redispersion powder redispersible in water produced by the process as claimed in claim 1.

11. A coating material and binder for textiles and paper comprising
    a redispersion powder redispersible in water produced by the process as claimed in claim 1.

12. The process as claimed in claim 1, wherein the hydroxycarboxylic acid is added before the polymerizing.

13. The process as claimed in claim 1, wherein the hydroxycarboxylic acid is added during the polymerizing.

14. The process as claimed in claim 1, wherein the hydroxycarboxylic acid is added after the polymerizing but before the drying.

15. A process for the preparation of a vinylaromatic copolymer redispersion powder redispersible in water comprising the steps of
    free-radical emulsion polymerizing of a comonomer mixture comprising
    (a) at least one vinylaromatic comonomer;
    (b) at least one comonomer selected from the group consisting of a 1,3-diene comonomer (b1) and an ester comonomer (b2) selected from the group consisting of an alkyl ester having 1 to 8 C atoms of acrylic acid and an alkyl ester having 1 to 8 C atoms of methacrylic acid and
    (c) 0.1 to 10% by weight, based on the total weight of the comonomer mixture, of at least one ethylenically unsaturated comonomer selected from the group consisting of an ethylenically unsaturated monocarboxylic acid, an ethylenically unsaturated dicarboxylic acid and anhydrides thereof, an ethylenically unsaturated carboxamide, an ethylenically unsaturated sulfonic acid, and salts thereof; and
    drying an aqueous copolymer dispersion obtained thereby; and
    adding at least one hydroxycarboxylic acid or a salt thereof to the aqueous copolymer dispersion in an amount of 3% to 40% by weight, based on the total weight of copolymer, in a manner selected from the group consisting of before the polymerizing, and during the polymerizing.

* * * * *